United States Patent [19]

Cullick et al.

[11] Patent Number: 5,042,580
[45] Date of Patent: Aug. 27, 1991

[54] OIL RECOVERY PROCESS FOR USE IN FRACTURED RESERVOIRS

[75] Inventors: Alvin S. Cullick; Randy D. Hazlett, both of Dallas, Tex.

[73] Assignee: Mobil Oil Corporation, Fairfax, Va.

[21] Appl. No.: 551,226

[22] Filed: Jul. 11, 1990

[51] Int. Cl.$^5$ .................. E21B 43/22; E21B 49/00
[52] U.S. Cl. .................... 166/252; 166/273; 166/274
[58] Field of Search ............ 166/252, 271, 273, 274, 166/275

[56] References Cited

U.S. PATENT DOCUMENTS

| | | | |
|---|---|---|---|
| 2,792,894 | 5/1957 | Graham et al. | 166/274 X |
| 2,800,962 | 7/1957 | Garst | 166/274 X |
| 3,028,912 | 4/1962 | Berry, Jr. et al. | 166/252 |
| 3,100,524 | 8/1963 | Beeson | 166/273 |
| 3,203,480 | 8/1965 | Froning | 166/252 |
| 3,258,072 | 6/1966 | Froning | 155/252 |
| 3,386,506 | 6/1968 | Quance | 166/273 |
| 3,498,378 | 3/1970 | Stone et al. | 166/275 X |
| 3,548,941 | 12/1970 | Graham et al. | 166/273 |
| 3,927,716 | 12/1975 | Burdyn et al. | 166/270 |
| 3,977,470 | 8/1976 | Chang | 166/273 |
| 4,129,183 | 12/1978 | Kalfoglou | 166/274 X |
| 4,479,894 | 10/1984 | Chen et al. | 252/8.55 |
| 4,570,713 | 2/1986 | Rice | 166/275 |
| 4,617,996 | 10/1986 | Shu | 166/273 |
| 4,624,314 | 11/1986 | Clark | 166/271 |
| 4,714,113 | 12/1987 | Mohnot et al. | 166/270 |
| 4,819,729 | 4/1989 | Bae et al. | 166/305.1 |
| 4,842,065 | 6/1989 | McClure | 166/252 |

*Primary Examiner*—George A. Suchfield
*Attorney, Agent, or Firm*—Alexander J. McKillop; Charles J. Speciale; Michael J. Mlotkowski

[57] ABSTRACT

A process for recovering oil from fractured formations is provided which involves altering the wettability of the formation, particularly at the interface of the fracture and rock matrix. The process of the present invention improves the ability of injected fluids flowing in the fracture to enter the rock matrix to displace oil. When employed in conjunction with a water-wet fractured oil-bearing formation, the process comprises the steps of: injecting a wettability agent capable of transforming the water-wet fractured formation from water-wet to oil-wet; contacting the oil-wet fractured formation with the wettability agent so injected at a fracture/matrix interface; injecting an oil miscible solvent; and recovering oil. A process for use with an oil-wet fractured oil-bearing formation is also provided.

16 Claims, 3 Drawing Sheets

OIL RECOVERY PROCESS FOR USE IN FRACTURED RESERVOIRS

FIELD OF THE INVENTION

The present invention relates to the recovery of oil from subterranean oil-bearing reservoirs and, more particularly, to a process for recovering oil from a fractured formation by wettability alteration.

BACKGROUND OF THE INVENTION

In the recovery of oil from oil-bearing reservoirs, it is usually possible to recover only a minor portion of the original oil present in the reservoir by the so-called primary recovery methods which utilize only the natural forces present in the reservoir. Thus, a variety of supplemental recovery techniques have been employed in order to increase the recovery of oil from subterranean reservoirs. The most widely used supplemental recovery technique is fluid flooding which involves the injection of a fluid, such as water or a miscible solvent, into an oil-bearing reservoir. As the fluid moves through the reservoir, it acts to displace oil therein to a production system composed of one or more wells through which the oil is recovered.

It has long been recognized that a variety of factors such as the interfacial tension between the injected fluid and the reservoir oil, the relative mobilities of the reservoir oil and the injected fluid, and the wettability characteristics of rock surfaces within the reservoir are factors which influence the amount of oil recovered by the various flooding techniques. Thus, it has been proposed to add surfactants to injected water in order to lower the oil-water interfacial tension and/or to alter the wettability characteristics of the reservoir rock. Also, it has been proposed to add thickening agents to all or part of the injected fluid in order to increase the viscosity thereof, thus decreasing the mobility ratio between the injected fluid and the oil and improving the sweep efficiency of the flood.

In fractured formations, the fractures generally act as primary fluid flow conduits, with the reservoir matrix providing the primary fluid storage capacity for the reservoir fluids. If the fractures are highly conductive, as compared to the reservoir matrix, the injection of a displacement fluid, such as water, may be relatively ineffective in recovering oil from the matrix. The capability of the displacing fluid to enter the matrix to displace oil has been found to depend in large part on the wettability of the matrix.

Wettability is the tendency of a surface to be wetted by a fluid. Water will "wet" or spread on a water-wet solid surface and will be repelled by an oil-wet surface. When an oil-filled porous rock matrix containing a connate water saturation is water-wet, water will spontaneously imbibe into the matrix to displace oil. However even after the waterflood, oil remains in the matrix, either because of poor sweep characteristics or because it remains trapped by capillary forces. Such trapped oil is often referred to as residual oil, and is typically 20 to 35 percent of the total pore volume. Unswept pore space resulting from the presence of the fracture may leave an additional 10 to 20 percent of the oil within the matrix. A method often employed to recover such residual oil after a waterflood is to utilize a miscible solvent, such as a light hydrocarbon, carbon dioxide or nitrogen. This is known to those skilled in the art as tertiary recovery by miscible flooding. In a water-wet fractured formation, the miscible solvent will not imbibe into the matrix and therefor will tend to exhibit poor flow and sweep of the formation.

In contrast to the water-wet formation, an oil-wet, fractured formation will experience poor oil recovery by waterflooding because the water will not imbibe into the matrix. The same oil-wet formation will experience good oil recovery by miscible solvent flooding, however.

Therefore what is needed is a process for recovering oil which enhances the efficiency of secondary and tertiary oil recovery techniques in formations having natural fractures therein.

SUMMARY OF THE INVENTION

A process for recovering oil from fractured formations is provided which involves altering the wettability of the formation, particularly at the interface of the fracture and rock matrix. The process of the present invention improves the ability of injected fluids that are flowing in the fracture to enter the rock matrix to displace oil. When employed in conjunction with a water-wet fractured oil-bearing formation having an injection well and production well in fluid communication with a substantial portion of the formation, the process comprises the steps of: injecting via the injection well a wettability agent capable of transforming the water-wet fractured formation from water-wet to oil-wet; contacting the water-wet fractured formation with the wettability agent so injected at the fracture-matrix interface; injecting via the injection well a oil miscible solvent; and recovering oil via the production well. Such a process is particularly effective when when employed following a waterflooding operation which is conducted until the economic water-to-oil ratio is surpassed.

When employed in conjunction with an oil-wet fractured oil-bearing formation the process of the present invention comprises the steps of: injecting via the injection well a wettability agent capable of transforming the oil-wet fractured formation from oil-wet to water-wet; contacting the oil-wet fractured formation with the wettability agent so injected at the fracture-matrix interface; injecting via the injection well a water-based flooding fluid; and recovering oil via the production well.

Therefore, it is an object of the present invention to provide a process for recovering oil from a fractured formation which is capable of increasing the amount of oil recoverable by flooding techniques.

It is another object of the present invention to provide a process for recovering oil from a fractured formation which is effective in water-wet formations.

It is a further object of the present invention to provide a process for recovering oil from a fractured formation which is effective in oil-wet formations.

Other objects and the several advantages of the present invention will become apparent to those skilled in the art upon a reading of the specification and the claims appended thereto.

DETAILED DESCRIPTION OF THE INVENTION

Oil is recovered from a subterranean, oil-bearing formation or reservoir by injecting a displacing fluid into the reservoir through an injection well and recovering fluids from a production well which is at a horizontal distance or offset from the injection well. In practice, more than one injection well and more than one production well may be used and these may be arranged in a number of different patterns suitable for operations of this kind. For example, the wells may be arranged in a line drive wherein injection wells are arranged in a line and the production wells in lines parallel to the injection wells or in a pattern such as a five spot, seven spot inverted seven spot or other conventional patterns well recognized by those skilled in the art. For ease of description, the present invention is described below with reference only to a single injection well and a single production well.

Displacing fluids envisioned for use in the practice of the present invention are to be selected on the basis of prevailing reservoir conditions and economics from among those fluids well-known to those skilled in the art. Waterflooding processes, such as described in U.S. Pat. No. 4,479,894, issued to Chen et al., incorporated herein by reference in its entirety, can be utilized in the practice of the present invention. Carbon dioxide, a relatively cheap and readily available displacing fluid, is also envisioned for use in the practice of the present invention. As is known, carbon dioxide interacts favorably with reservoir oil since it dissolves in oil and tends to swell the oil and reduce its viscosity. Even under conditions unfavorable to forming a solution phase with the reservoir oil, carbon dioxide penetrates into the oil, forming a mobile phase which can then be displaced. The addition of a light hydrocarbon, such as ethane, to the carbon dioxide is also within the scope of the process of the present invention. This has the effect of promoting a greater viscosity reduction than if the carbon dioxide were to be used alone as a displacing fluid. Although ethane is generally preferred, other light hydrocarbons such as liquid petroleum gas (LPG) or $C_3$ to $C_6$ alkanes such as propane and butane may also be used. Details regarding the use of light hydrocarbons as an additive for use in carbon dioxide flooding is described in more detail in U.S. Pat. No. 4,617,996, the contents of which are incorporated herein by reference in their entirety. Other solvent floods are also envisioned as benefitting from the practice of the present invention. Such solvents include light hydrocarbons such as liquid petroleum gas (LPG) and $C_2$ to $C_6$ range paraffins. These solvents can be used in cyclical operations wherein lower cost displacing fluids, such as water, are utilized following solvent injection.

The process of the present invention involves altering the wettability of the formation, particularly near the fracture/matrix interface, for the purpose of improving the ability of injected fluids, that are flowing in the fracture, to enter the rock matrix to displace oil. As is known by those skilled in the art, wettability can be altered by injection of surface active chemicals. When employed in an oil-bearing water-wet formation, the process includes the following steps: (1) waterflood to the economic water-to-oil ratio; (2) inject a slug of a wettability altering agent; (3) begin a large slug miscible solvent injection. The wettability altering agent is selected from the group of wettability altering chemicals, aromatic/asphaltic oils, propane or carbon dioxide.

In an originally water-wet formation, the process targets the 20–50% of the oil left after the waterflood. This oil is recoverable if contacted by miscible solvent. The entry of miscible solvent from the fracture into the matrix will be most efficient only when the rock is oil-wet.

The wettability of the rock can be altered from water-wet to oil-wet by means of a wettability altering chemical. Chemicals capable of wettability alteration by adsorbing or chemically adhering to rock surfaces are cationic surfactants, anionic surfactants, silanes, fatty acid complexes and aromatic/asphaltic oils. The surfactants have a hydrophilic head group and a long hydrocarbon hydrophobic tail. When the hydrophilic head adheres to the rock surface, the hydrophobic tail repels water, thus making the surface oil-wet. Compounds that are adsorptive on the rock should have an opposite charge than the solid for best results. Some highly aromatic/asphaltic oils also have the effect of "weathering" the rock surface to make it more oil wet.

One preferred group of wettability altering chemicals is the fatty acid chromyl chlorides, marketed under the tradename, Quilon® by E. I. DuPont de Nemours & Co. of Wilmington, Del. The Quilon® fatty acid chromyl chlorides are chemically reactive Werner complexes wherein a C14 to C18 fatty acid is coordinated with trivalent chromium. M, a myristato chromic chloride is another example of the group of useful fatty acid chromyl chlorides. Another preferred group is also a chemically reactive Werner complex of methacrylate chromic chloride wherein methacrylate acid is coordinated with chromium. Such products are marketed under the tradename of Volan® by E. I. DuPont de Nemours & Co. of Wilmington, Del. Also available from E. I. DuPont de Nemours & Co. is a product marketed as Volan® L which is a reduced chlorine content methacrylate chromic chloride, also having utility in the practice of the present invention. These Werner complexes are more fully described in U.S. Pat. No. 4,129,183, the contents of which are incorporated by reference for such details. An example of a suitable silane is the N-beta-aminoethyl-gamma-aminopropyl-trimethoxy-silane marketed by the Dow Corning Corporation of Midland, MI.

In a preferred embodiment of the process of the present invention, following the waterflood, a water-soluble chemical could be injected in an aqueous slug. The chemical so injected should possess an affinity for the rock surface by either adsorption or chemical reaction. Only a small volume of the wettability altering chemical agent relative to the total pore volume is required, since the fluid flows preferentially in the fracture and thus will contact and alter the matrix/fracture interface first.

An alternative to the process for recovering oil left after a waterflooding operation is to alter wettability at the beginning of the secondary recovery phase and then proceed with a secondary miscible fluid flood. This can be very effective in recovering the oil because the miscible solvent can sweep the oil-wet matrix. The process of the present invention, when used in conjunction with a water-wet rock matrix, includes injecting a "reverse" wettability altering agent in solution in the leading edge of the miscible solvent slug. The wettability altering agent to be utilized is soluble in carbon dioxide or hydrocarbon solvents and phase transfers across the water film to adsorb on the rock surface.

Another class of chemicals having utility in the practice of the present invention is not water-soluble but causes the in-situ reservoir crude to precipitate asphaltenes that adhere to the rock surface, making it more oil wet. Changing rock properties by deasphalting with carbon dioxide is such a procedure and its use, as such, is encompassed by the present invention. Propane is also a well-known deasphalting agent for use in this application. If the in-situ oil does not contain asphaltenes, a small slug of an asphaltic oil can be injected and followed by carbon dioxide or propane.

It is to be recognized that the recovery of oil will be impacted by the transmissibility modification which is achieved between matrix and fracture to the extent of the wettability modification, that is, the depth of penetration of the chemical into the matrix is a primary factor in this phenomena. The miscible solvent normally will invade the matrix up to the depth of convective chemical penetration, unless the adsorptive compound has high surface diffusion. Diffusion within the solid rock matrix can lead to much greater matrix wettability alteration, and thus more efficient sweep by miscible solvent.

In the case of a horizontal fracture and a relatively low density solvent, gravity aids the penetration of the solvent into the rock, once the wettability is altered. This has been demonstrated in the laboratory by comparing oil recovered from hydrocarbon solvent and carbon dioxide injections into water-wet and oil-wet cores. Carbon dioxide injections recovered much more oil from the oil-wet core than did the hydrocarbon solvent, whereas the recoveries were low and about the same from the same core when it was made water-wet. This reveals that the lower density of carbon dioxide enables it to advantageously penetrate the upper rock matrix layer.

Waterflooding an initially oil-wet fractured rock has been found to result in very low levels of oil recovery. In utilizing the process of the present invention to overcome the problems normally encountered in waterflooding under these conditions, a wettability altering chemical agent would be injected that would alter the rock from oil-wet to water-wet. Thereafter, an efficient waterflood could be performed. There are many water-soluble wettability altering chemical agents available commercially. Appropriate agents would have the characteristic to adsorb on the oil-wet rock surface "tail down", that is to say, with the hydrophobic tail attached to the surface.

The process of the present invention is further illustrated by the following examples, which are presented for illustrative purposes, only, and are not intended as limiting the scope of the invention which is defined by the appended claims.

EXAMPLES

The core samples utilized in the examples hereinafter described were obtained from a Texas cream limestone outcrop having approximately a 10 millidarcy (md) permeability to brine. Three core samples were prepared. These were: (1) a one-piece, unfractured, core; (2) two hemicylindrical pieces of about equal cross-section, butted together against their smooth saw cut faces to form a cylindrical core; (3) two hemicylindrical pieces, again of about equal cross-section, but butted against roughened faces. The cores so prepared were mounted in rubber sleeves inside a cell of the well-known Hassler type. Confining pressure of at least 500 psi was applied to seal the cores. The fluid displacements were conducted at constant temperature (120° F.) and constant back pressure (2000 psi). Fluid recoveries and in-situ saturations were determined by material balance of injected and outlet volumes.

A PC-based data system was utilized to record gas, oil, and water volumes produced, pressure, pressure drop, temperature, and injected volume. The core effluent first passed through a backpressure regulator and then into a water/oil membrane separator. The oil phase with any gas then passed into a gas/liquid separator, from which the gas went to the gasometer.

A series of floods were run on each core without any treatment and again after treatment with DuPont Quilon ® to make them oil-wet. The cores were mounted horizontally, with the artificial fracture also positioned horizontally. For each core, the series of floods were as follows: core preparation to establish an initial residual water saturation with decane as the oil phase; waterflood displacement of the decane; miscible flood displacement of the decane with a hydrocarbon solvent (usually dodecane); waterflood to residual hydrocarbon; miscible flood with carbon dioxide.

Permeabilities to brine and the dimensions of the various Texas cream limestone cores used are listed in Table 1, below. Various core plugs had permeabilities to water ranging from about 9 to about 13 md. The artificially fractured cores were formed by simply butting the faces of two hemi- cylindrical cores that had been cut along their length. With the smooth saw cut, butting the pieces together under 500 psi or more sleeve confining pressure resulted in little change to the core's fluid flow properties, as compared with an unfractured core. Thus, the smooth-faced fractured core had roughly the sam permeability and similar recovery characteristics as a single, unfractured core. In order to create an artificial fracture with higher flow capacity, the surface of the cut was roughened by blasting with small glass beads. Blast force was used to control roughness to yield an overall averaged permeability for the core of about 202 md. (See Table 1).

A range of approximate apertures for the roughened fracture was calculated using assumed friction factors and making the simplifying assumption that all flow was in the fracture. The calculated aperture of the fracture was 0.0018 inches, assuming a friction factor of $96/N_{Re}$, and 0.0024 inches for an assumed friction factor of $240/N_{Re}$. The 0.0024 inches was viewed as an upper limit, since the assumed friction factor of 240 is rather high. Further, in reality, all fluid does not flow in the fracture. The pressure drop across the core was also measured as a function of confining pressure. The overall permeability decreased by 12% for a pressure increase from 700 psi to 1000 psi, indicating that the fracture could be closed slightly by increasing the confining pressure.

As mentioned, core wettability was changed by treatment with DuPont Quilon ®. Quilon ® is a chrome complex in an isopropyl alcohol (IPA) solution. The Quilon ® molecules contain a hydrophobic fatty-acid group that, after reaction with the rock surface, is oriented away from the surface to give the core oilwet characteristics. To attempt to obtain a monolayer of Quilon ® on the rock surface, a process of alternating the injection of slugs of Quilon ® and water into the dry core was employed. The core was then flushed with IPA, dried with nitrogen, and cured at 130° F. for several days. Quilon ® treatment at 100% of its as-received concentration was found to reduce the permeability of the core by as much as 50%. To avoid this result, the Quilon ® was diluted to 20% and 40% concentrations. While one core plug treated with 20% concentration had no reduction in permeability, water saturations obtained at the end of each mineral oil flush are listed in Table 2 as the initial water saturation. The displacement was conducted at the rate of 0.27 cc/min for 1.5 to 2 hydrocarbon pore volumes (HCPV), well beyond the last oil production. Then the rate was increased in steps up to 2.0 cc/min to reduce the oil saturation to as low as possible. The oil recovery at 1

TABLE 1

SUMMARY OF CORE CONDITIONS

| Core Condition | Dimensions L-cm | Dimensions A-cm$^2$ | Porosity % | Permeability to Brine md | Amott-Harvey Wettability Index of Plug Sample |
|---|---|---|---|---|---|
| Unfractured Core | 29.80 | 19.635 | 26 | 10 | +0.88 |
| Unfractured Core (20% Quilon ® treated) | 29.80 | 19.635 | 26 | 7.5 | −0.093 |
| Artificial Smooth Fracture | 29.65 | 18.70 | 26 | 10 | +0.88 |
| Artificial Rough Fracture | 29.57 | 19.66 | 25 | 202 | +0.88 |
| Artificial Rough Fracture (40% Quilon ® treated) | 29.57 | 19.66 | 25 |  | −0.577 | other cores, however, showed 25% permeability reduction, to about 7.5 md, for the 20% and 40% treatments.

Wettability of plugs of Texas cream that had been treated with Quilon ® were determined by simple inhibition tests and by the well-known Amott-Harvey test. The Amott-Harvey index is the ratio of water spontaneously imbibed into a core at connate water saturation to the total volume of water under centrifuge. Untreated cores spontaneously imbibed water and would not take in oil, whereas the reverse was true for treated cores. The Amott-Harvey indices of the core plugs are listed in Table 1. The unfractured core treated with the 20% Quilon ® concentration was neutral to slightly oil-wet, and the core plug treated with 40% Quilon ® was moderately oil-wet. The wettability of the artificial rough fractured core was not accurately known, since the treatment with the Quilon ® solution may not have been uniform due to the fracture.

Each test core was subjected to the following steps: (1) Core cleaning and evacuation. (2) Filling with brine and measurement of permeability and pore volume. (3) Brine flushing with several pore volumes of mineral oil at steadily increasing flow rates to reach residual water saturation. For the unfractured cores, the residual water was believed to be near interstitial. In the case of the water-wet artificially fractured cores, the residual water was higher than interstitial due to difficulties encountered when forcing oil into the rock matrix. (4) The mineral oil was then flushed out with Soltrol. (5) The Soltrol was flushed with decane. (6) The decane was then displaced with brine to residual oil saturation.

As an example, the mineral flood of the water-wet brine-filled, fractured core (Step 3) went as follows: 0.4 cc/min, $\Delta P \approx 90$ psi, $S_w = 51.5\%$; 0.8 cc/min, $\Delta P = 175$ psi; 2 cc/min, $\Delta = 350$ psi, $S_w = 3\%$; 4 cc/min, $\Delta = 460$ psi, $S_w = 33.5\%$; 8 cc/min, $\Delta P = 560$ psi $S_w = 37\%$. The HCPV of water injection and the final waterflood oil saturations are given in Table 2. The final saturations are higher for the fractured cores, due to the poorer sweep.

After the brine flood, the first miscible displacement was conducted with n-dodecane as the solvent (in the last run, n-tetradecane was used, instead) at a rate of 0.27 cc/min. The displacement with solvent was first-contact miscible and viscous stable at the nominal injection velocity of 2.3 ft/D. The recovery of decane was determined by measuring its concentration in the effluent oil fractions with gas chromatography.

Following the miscible flood, the core was then waterflooded again to a final oil saturation, as before. Then, a first contact miscible carbon dioxide displacement of the oil (residual mix of decane and dodecane or tetradecane) was conducted. The much lower viscosity and density of carbon dioxide presented the potential for viscous fingering and gravity override. This flood was also at a constant 0.27 cc/min (2.3 ft/D) rate throughout. After the carbon dioxide miscible flood, cores were cleaned and then treated with Quilon ®, as described above. Then the entire series of floods was repeated on the Quilon ®-treated cores.

Relative permeabilities were not measured directly, however end point values were calculated from pressure difference measurements on the non-fractured, single cores and the smooth-fractured core. The estimated crossover point, that is, the water saturation at which the oil and water relative permeabilities are equal, was found to be about 59% for the water-wet cores and 46% for the slightly oil-wet core (20% Quilon ®-treated). It is believed that for the 40% Quilon ®-treated core, crossover would occur at a somewhat lower water saturation.

TABLE 2

SUMMARY OF EXPERIMENTAL OIL RECOVERIES

| | Oil Recovery (%)$^c$ | | | | | | | $S_{or}$, % | Initial |
|---|---|---|---|---|---|---|---|---|---|
| | Waterflood | Miscible Solvent | | | Miscible Carbon Dioxide | | | Ultimate to | Water |
| Core Condition | (at 1 HCPV) | (at 1.1 HCPV) | (at 2 HCPV) | (Ultimate) | (at 1.1 HCPV) | (at 2 HCPV) | (Ultimate) | Waterflood | Saturation, %$^d$ |
| Non-fractured Core - water-wet | 56 | 63 | | 65 | 64 | | 69 | 35.5 | 19.8 |
| Non-fractured Core - oil-wet$^a$ | 55 | 98 | | 99.6 | 86 | | 91 | 35.9 | 21.4 |
| Artificial Smooth Fracture - water-wet | 60 | 68 | | 72 | 59 | | 80 | 32.3 | 19.7 |
| Artificial Rough | 25 | 22 | 28 | 31 | ~18 | ~28 | 31 | 44.8 | 31.8 |

TABLE 2-continued

SUMMARY OF EXPERIMENTAL OIL RECOVERIES

| | Oil Recovery (%)[c] | | | | | | | |
|---|---|---|---|---|---|---|---|---|
| | Waterflood | Miscible Solvent | | | Miscible Carbon Dioxide | | | $S_{or}$, % | Initial |
| Core Condition | (at 1 HCPV) | (at 1.1 HCPV) | (at 2 HCPV) | (Ultimate) | (at 1.1 HCPV) | (at 2 HCPV) | (Ultimate) | Ultimate to Waterflood | Water Saturation, %[d] |
| Fracture - water-wet Artificial Rough Fracture - oil-wet[b] | 12 | 29 | 39 | 47 | ~38 | ~56 | 66 | 45.9 | 28.3 |

[a]20% Quilon ® treatment.
[b]40% Quilon ® treatment.
[c]Percent of oil in place; for miscible floods, percent of waterflood $S_{or}$.
[d]Water saturation at end of mineral oil flush.

TABLE 3

PRODUCTION OF DISPLACING FLUID

| | First Production Observed (Percent HCPV) | | |
|---|---|---|---|
| Core Condition | Miscible Solvent | Miscible CO$_2$ | Waterflood |
| Nonfractured Core - water-wet | 18 | 17 | 88 |
| Nonfractured Core - oil-wet | 47 | 32 | 39 |
| Artificial Smooth Fracture - water-wet | 9 | 4 | 57 |
| Artificial Rough Fracture - water-wet | 5 | 9 | 19 |
| Artificial Rough Fracture - oil-wet | 4 | 12 | 4 |

Oil recovery test results, presented in Table 2, demonstrate the strong influence of wettability on oil recovery. The recovery percentages are based on the amount of the recovered fluid that was in place at the beginning of the particular displacement. The HCPV is based on hydrocarbon pore volume at the lowest water saturation achieved by mineral oil flood for that core. For the fractured cores, the recovery of oil increased markedly for the oil-wet cases as compared with the water-wet cases. For example, at 1.1 HCPV injected, the recovery of tertiary residual oil by miscible solvent was 32% higher for the oil-wet, and for miscible carbon dioxide, it was more than 100% higher.

The non-fractured core displacements established baseline recoveries from the Texas cream rock matrix. For both the water- and oil-wet water-floods, the recovery was about 55% at 1 HCPV produced. The miscible flood recovery in the oil-wet core was much better than in the water-wet core. The stable, miscible flood in the oil-wet core achieved nearly 100% recovery. Solvent production began much earlier for the water-wet case than for the oil-wet (Table 3) for the nonfractured cores, with the opposite being true for the first production of water during the waterfloods. The artificial smooth-fractured core gave about the same recoveries, permeability, and pressure drop as the nonfractured core, demonstrating that the smooth cut had little effect on overall sweep, even though solvent breakthrough occurred much earlier. Thus, the smooth cut provided a conduit for a small volume of fluid to channel but was tight enough not to have a major effect on overall sweep. The carbon dioxide flood, in particular, broke through very fast in the smooth fractured core, after only 4% HCPV produced, but the overall recovery was good. Higher pressure was experienced in the oil-wet flood. This was attributed to the lower relative permeability to oil and the lower absolute permeability of the oil-wet core. Oil has a lower relative permeability at a given saturation in an oil-wet rock, as compared to a water-wet rock. In water-wet rock, the oil does not flow in the smallest water-filled pores, whereas in the oil-wet rock, oil will also flow in the smallest, more restrictive pores, as well as in the large pores.

The waterfloods of the fractured cores show the effect of the fracture and of water inhibition on oil recovery. As shown in Table 3, the first water production during the waterflood of the water-wet fractured core occurred at only 19% HCPV produced. In the oil-wet case, however, water production began even sooner, at 4% HCPV. At 1 HCPV produced, 56% of an HCPV of water was produced in the water-wet flood and 87% of an HCPV of water was produced in the oil-wet case. In an oil-wet displacement, the water cannot imbibe into the matrix and flows primarily only in the fracture.

Figure 1:
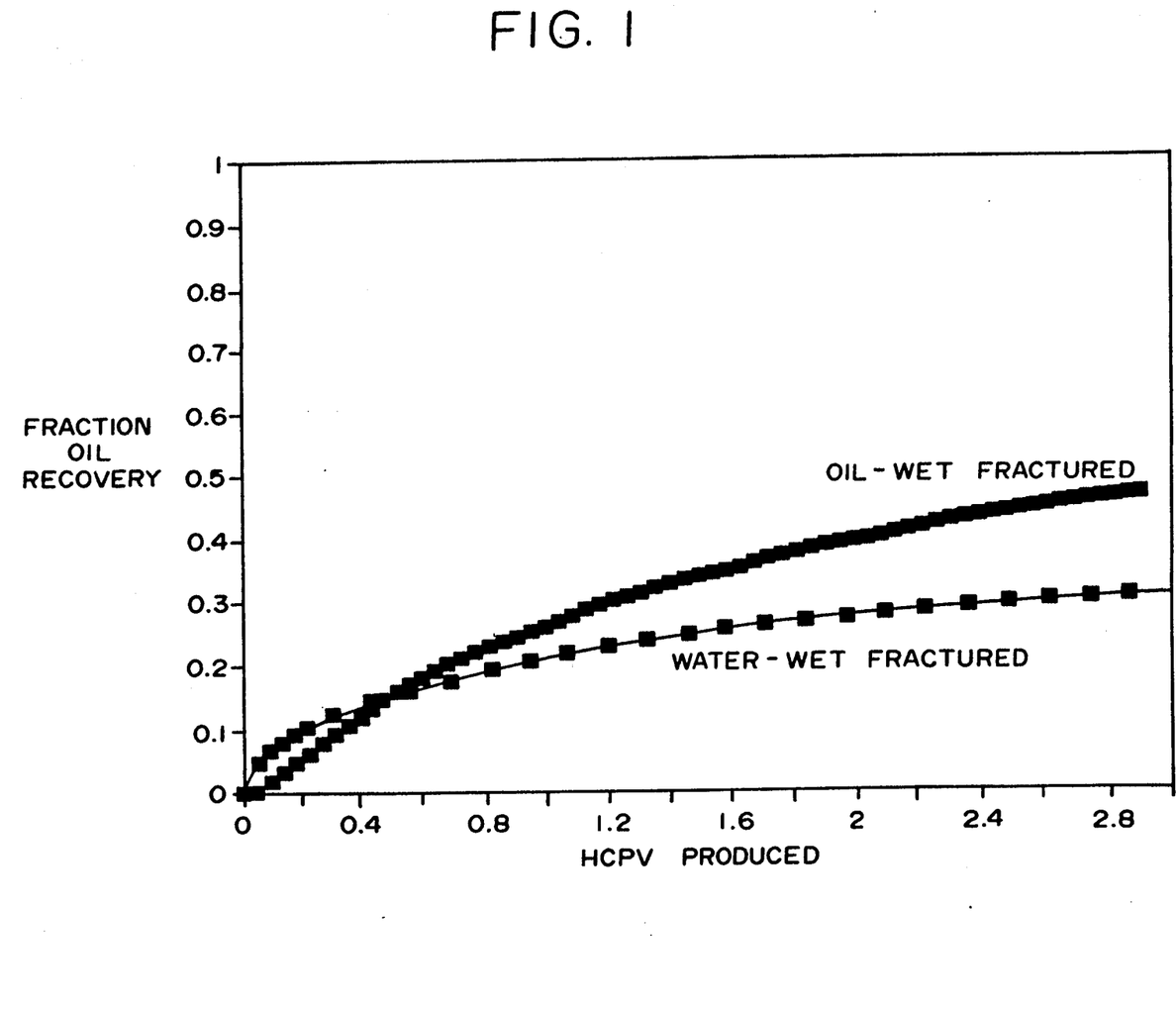
FIG. 1 graphically compares oil recovery from a water-wet fractured core to that of an oil-wet fractured core for a miscible solvent flood.
Figure 2:
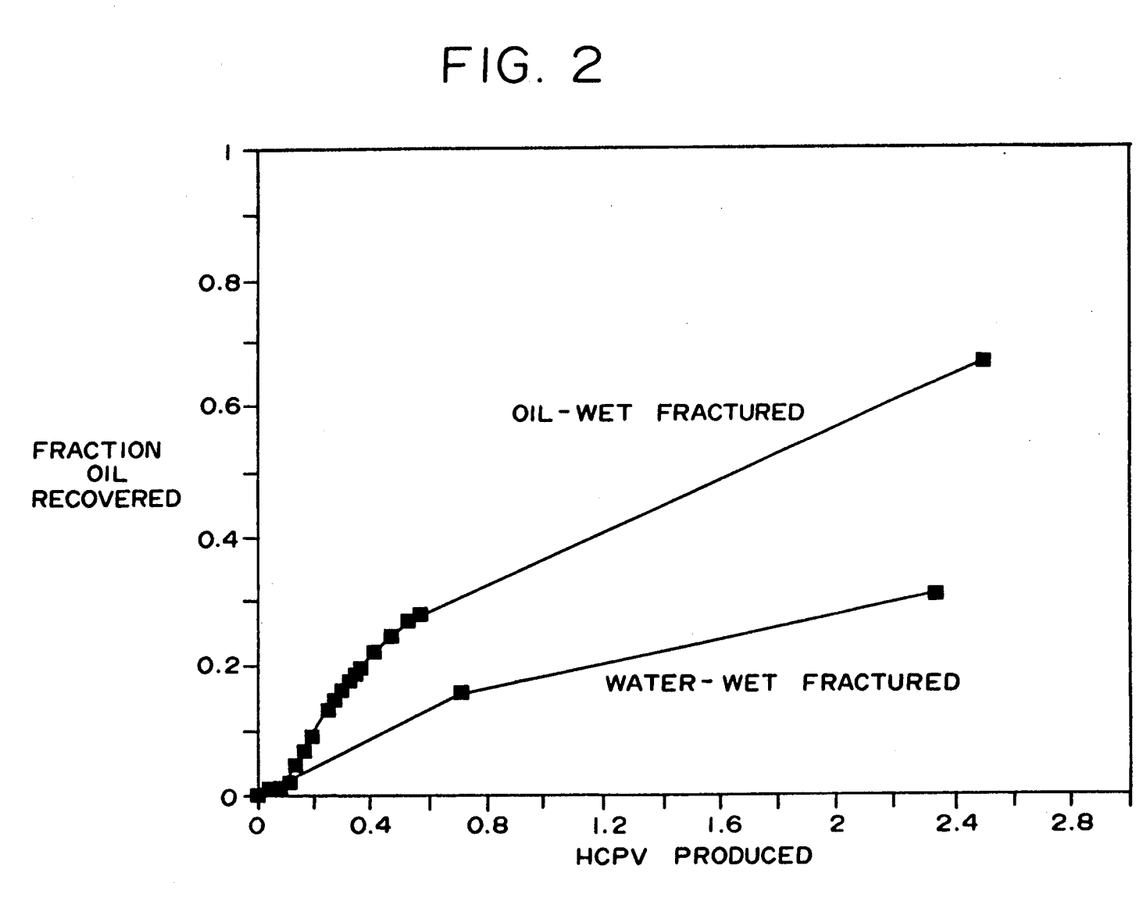
FIG. 2 graphically compares oil recovery from a water-wet fractured core to that of an oil-wet fractured core for a miscible carbon dioxide flood.

Oil recovery curves are presented in FIG. 1 and FIG. 2 for the fractured core displacements. FIG. 1 compares the recovery curves for the miscible solvent floods for the fractured, water-wet and oil-wet cores. FIG. 2 compares the recoveries for the carbon dioxide miscible floods in those same cores. For the water-wet fractured core, the recovery process proceeds by a combination of fluid flow in the highly conductive fracture, capillary and gravity-dominated exchange of fluids between matrix and fracture, and relative permeability-dominated flow in the matrix. During the waterflood phase, water enters the matrix at a relatively fast rate by inhibition. After exchange of a small volume of oil at the newly invaded matrix surface, the relative permeability to oil within a small thickness around the matrix-water-contacted area is nearly zero. Water continues to invade into this surface area. By gravity, the water will displace oil upward in the upper matrix layer, and water invading downward in the lower matrix layer will displace oil upward and toward the outlet. Since the matrix was not surrounded by the fracture, the oil in the upper matrix layer could not proceed upward out of the matrix, but only horizontally toward the outlet of the Hassler-type cell. With the single horizontal fracture, the water-flood recovered only 25%, which is much lower than would be the case for a vertical fracture system with water invading from the bottom.

Figure 3:
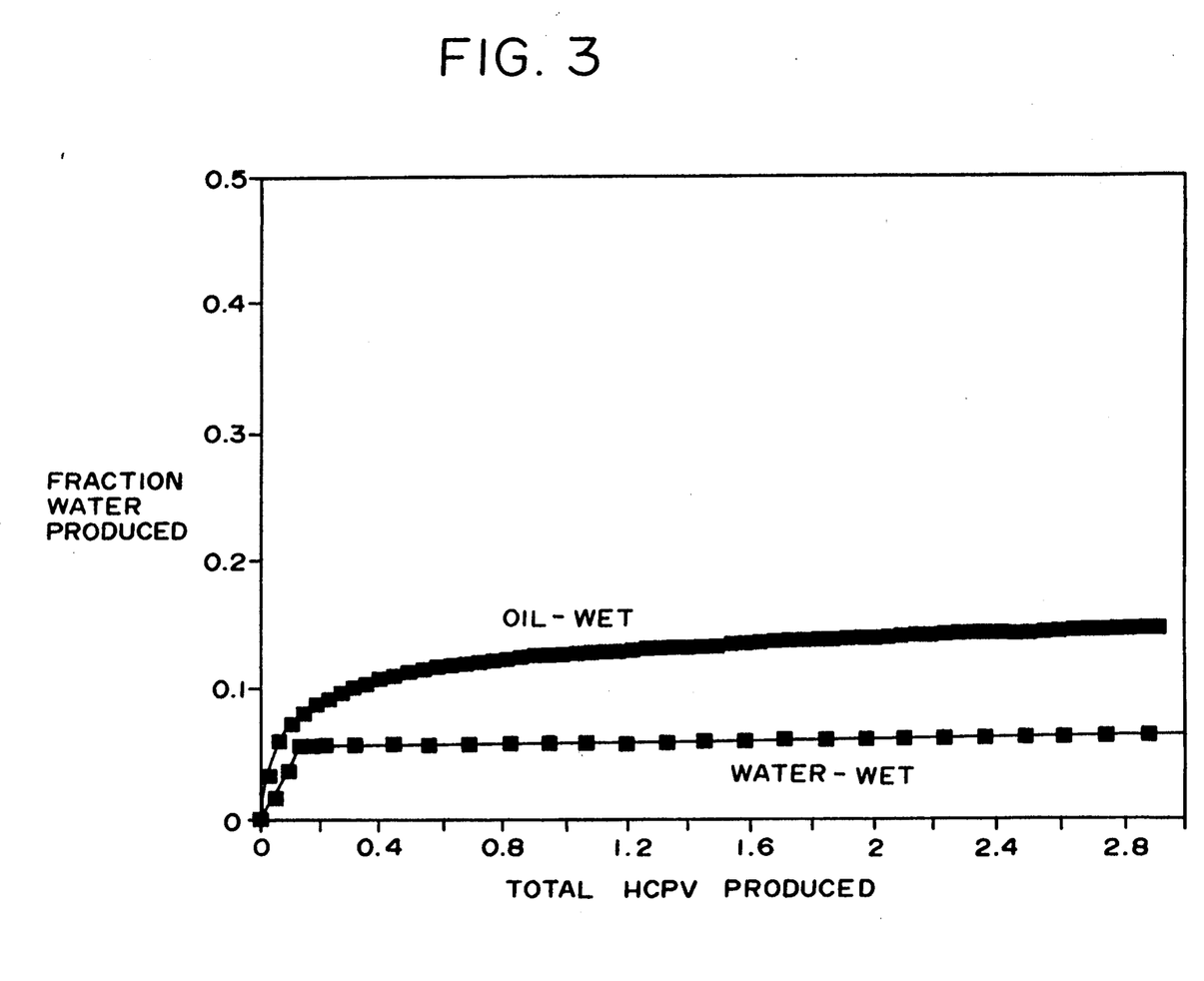
FIG. 3 presents a graphical comparison of water production from a water-wet fractured core to that of an oil-wet fractured core for a miscible solvent flood.

Water production curves for the miscible solvent floods are shown in FIG. 3. The water-wet flood shows that virtually all the water is produced during the first 10% HCPV produced. Since the solvent must overcome the capillary pressure to enter the matrix, it simply displaces water from the fracture and matrix volume nearest the fracture, and once that water has been displaced, little more is produced. In the oil-wet flood, the solvent imbibes into the matrix, where it displaces mobile water and residual oil.

Pressure drop during these floods is known to depend on the relative permeabilities of the phases in the fracture and in the matrix, the absolute permeabilities of the fracture and matrix, the fracture and matrix flow capacities, and on the extent of fluid exchange (inhibition) between matrix and fracture. It was found that the pressure drop during the oil-wet miscible flood was almost twenty times greater than that during the water-wet flood. The pressure drops in both miscible displacements in the fractured cores remained fairly constant throughout the displacements. This contrasts sharply with the pressure drop behavior in the non-fractured, water-wet core, which began very high initially at around 100 psi and then steadily decreased throughout the flood to about 22 psi as the flood went from high water saturation, with very low relative permeability, to high solvent saturation with high relative permeability. The pressure difference in the non-fractured oil-wet flood was about 2.5 times higher near the end of the flood than that for the water-wet flood, as described earlier. In the fractured cores, the flood is more complex. However, the cause of the 20-fold difference between the oil- and water-wet fractured floods is not known but seems to indicate that the solvent/oil may be flowing in the matrix in preference to the fracture. This could occur under certain conditions, when oil-wet, or if the two-phase relative permeability of the oil in the fracture was very low.

The miscible solvent flood in the water-wet fractured core recovered 22% of the residual oil, compared with 29% from the oil-wet. It is believed that the miscible solvent had to overcome the capillary pressure and the low relative permeability at the fracture/matrix interface in order to invade the water-wet matrix and contact oil. The solvent, being less dense than water, would flow preferentially into the upper matrix layer. The effect of gravity should be greater for carbon dioxide, which has a lower density than the solvent. In the oil-wet flood, gravity would have the effect of delaying the low-density carbon dioxide production and enhancing the sweep of carbon dioxide through the matrix, in comparison to the solvent.

As is well known, the movement of fluids between the matrix and fracture determines oil displacement efficiency. For a given fracture spacing and geometry, a waterflood recovery of oil will be much more efficient in a strongly water-wet rock than in an oil-wet rock. Thus, the tertiary oil recovery target will be smaller. The miscible solvent flood will recover a smaller fraction of the residual oil in a water-wet system as well. In an oil-wet rock, the water will recover less oil, leaving a large tertiary oil recovery target, and the miscible solvent will be relatively efficient in recovering that oil. Thus, a fractured reservoir that has had poor waterflood recovery may be an excellent miscible flood target, if found to be oil-wet. As demonstrated, the potential capillary and gravity effects are significant in enhanced recovery from fractured reservoirs. While the examples were not scaled to a specific fracture spacing, which is a critical variable in a reservoir, at the scale of the examples hereinabove described, capillary effects are known to be somewhat larger than would be experienced with large matrix blocks in a reservoir. Moreover, a horizontal fracture yields different results than would a vertical fracture.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the amended claims.

What is claimed is:

1. A process for recovering oil from a water-wet fractured oil-bearing formation having an injection well and production well in fluid communication with a substantial portion of the formation, comprising the steps of:
   (a) injecting a wettability agent selected from the group consisting of cationic surfactants, anionic surfactants, silanes, fatty acid complexes and aromatic/asphaltic oils, said wettability agent capable of transforming the water-wet fractured formation from water-wet to oil-wet;
   (b) contacting the water-wet fractured formation with the wettability agent injected in step (a) at a fracture/matrix interface;
   (c) injecting an oil miscible fluid; and
   (d) recovering oil.

2. The process of claim 1, wherein the wettability agent is a water soluble Werner-type chrome complex in which trivalent chromium atoms are coordinated with a ligand of a carboxylic acid.

3. The process of claim 2, wherein the ligand of the carboxylic acid of the Werner-type chrome complex contains a hydrocarbon radical having two to eight carbon atoms.

4. The process of claim 1, wherein the oil miscible fluid is an oil-miscible solvent selected from the group of consisting of ethane, propane, butane, pentane, hexane and mixtures thereof.

5. The process of claim 1, wherein the oil miscible fluid is carbon dioxide.

6. The process of claim 1, further comprising the step of waterflooding via the injection well to recover oil from the production well until economic oil recovery is exceeded, wherein said waterflooding step is conducted prior to said step of injecting a wettability agent.

7. The process of claim 6, wherein the wettability agent is a water soluble Werner-type chrome complex in which trivalent chromium atoms are coordinated with a ligand of a carboxylic acid.

8. The process of claim 7, wherein the ligand of the carboxylic acid of the Werner-type chrome complex contains a hydrocarbon radical having two to eight carbon atoms.

9. The process of claim 6, wherein the oil miscible fluid is an oil-miscible solvent selected from the group of consisting of ethane, propane, butane, pentane, hexane and mixtures thereof.

10. The process of claim 6, wherein the oil miscible fluid is carbon dioxide.

11. A process for enhancing the recovery of oil from a fractured oil-bearing formation having an initial wettability characteristic at a fracture-matrix interface and further having an injection well and production well in fluid communication with a substantial portion of the formation, comprising the steps of:
   (a) determining the initial wettability characteristic at the fracture-matrix interface;
   (b) injecting a wettability agent capable of transforming the initial wettability characteristic at the fracture-matrix interface;

(c) contacting the fractured formation with the wettability agent injected in step (a) at the fracture-matrix interface;

(d) injecting a flooding fluid; and (e) recovering oil.

12. The process of claim 11, wherein the wettability agent is selected from the group consisting of cationic surfactants, anionic surfactants, silanes, fatty acid complexes and aromatic/asphaltic oils.

13. A process for recovering oil from an oil-wet fractured oil-bearing formation having an injection well and production well in fluid communication with a substantial portion of the formation, comprising the steps of:

(a) conducting a miscible fluid flood to recover oil until economic oil recovery is exceeded;

(b) injecting a wettability agent capable of transforming the oil-wet fractured formation from oil-wet to water-wet;

(c) contacting the oil-wet fractured formation with the wettability agent injected in step (b) at a fracture-matrix interface;

(d) injecting a water-based flooding fluid; and (e) recovering oil.

14. The process of claim 13, wherein the wettability agent is a chemical agent having a hydrophobic tail and a hydrophilic head, the hydrophobic tail capable of attaching to an oil-wet rock surface.

15. The process of claim 13, wherein the oil miscible fluid is an oil-miscible solvent selected from the group of consisting of ethane, propane, butane, pentane, hexane and mixtures thereof.

16. The process of claim 13, wherein the oil miscible fluid is carbon dioxide.

* * * * *